(12) United States Patent
Kuroda

(10) Patent No.: US 7,333,716 B2
(45) Date of Patent: Feb. 19, 2008

(54) DUPLICATION CONTROLLING METHOD, DUPLICATION CONTROLLING APPARATUS, RECORDING MEDIUM, AND DUPLICATION CONTROLLING PROGRAM EMBODIED ON COMPUTER-READABLE MEDIUM

(75) Inventor: Kazuo Kuroda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1100 days.

(21) Appl. No.: 10/091,027

(22) Filed: Mar. 6, 2002

(65) Prior Publication Data

US 2002/0126996 A1    Sep. 12, 2002

(30) Foreign Application Priority Data

Mar. 7, 2001   (JP) ............................... P2001-64008

(51) Int. Cl.
*H04N 5/91* (2006.01)
*G11B 15/04* (2006.01)
*H04L 7/167* (2006.01)

(52) U.S. Cl. .......................... 386/94; 360/60; 380/201

(58) Field of Classification Search .................. 386/1, 386/94, 60; 713/176–177, 179; 360/60; 380/201
See application file for complete search history.

(56) References Cited

U.S. PATENT DOCUMENTS 6,430,291 B1 *   8/2002   Ogino et al. ................ 380/203
2005/0086488 A1 *   4/2005   Kori et al. ................... 713/176

FOREIGN PATENT DOCUMENTS

| EP | 0 969 462 A1 | 1/2000 |
|----|----|----|
| EP | 1 006 722 A2 | 6/2000 |
| JP | 2000-165248 A | 6/2000 |
| JP | 2000-216988 A | 8/2000 |
| JP | 2000-339851 A | 12/2000 |
| KR | 2001-0008048 A | 2/2001 |

* cited by examiner

*Primary Examiner*—Thai Q. Tran
*Assistant Examiner*—Hung Dang
(74) *Attorney, Agent, or Firm*—Sughrue Mion, PLLC

(57) ABSTRACT

The present invention is directed to a duplication controlling method for controlling duplication by embedding an electronic watermark indicating duplication-related control information into contents comprising digital information, wherein the electronic watermarks includes change position information indicating a change position of the contents of the control information.

24 Claims, 8 Drawing Sheets

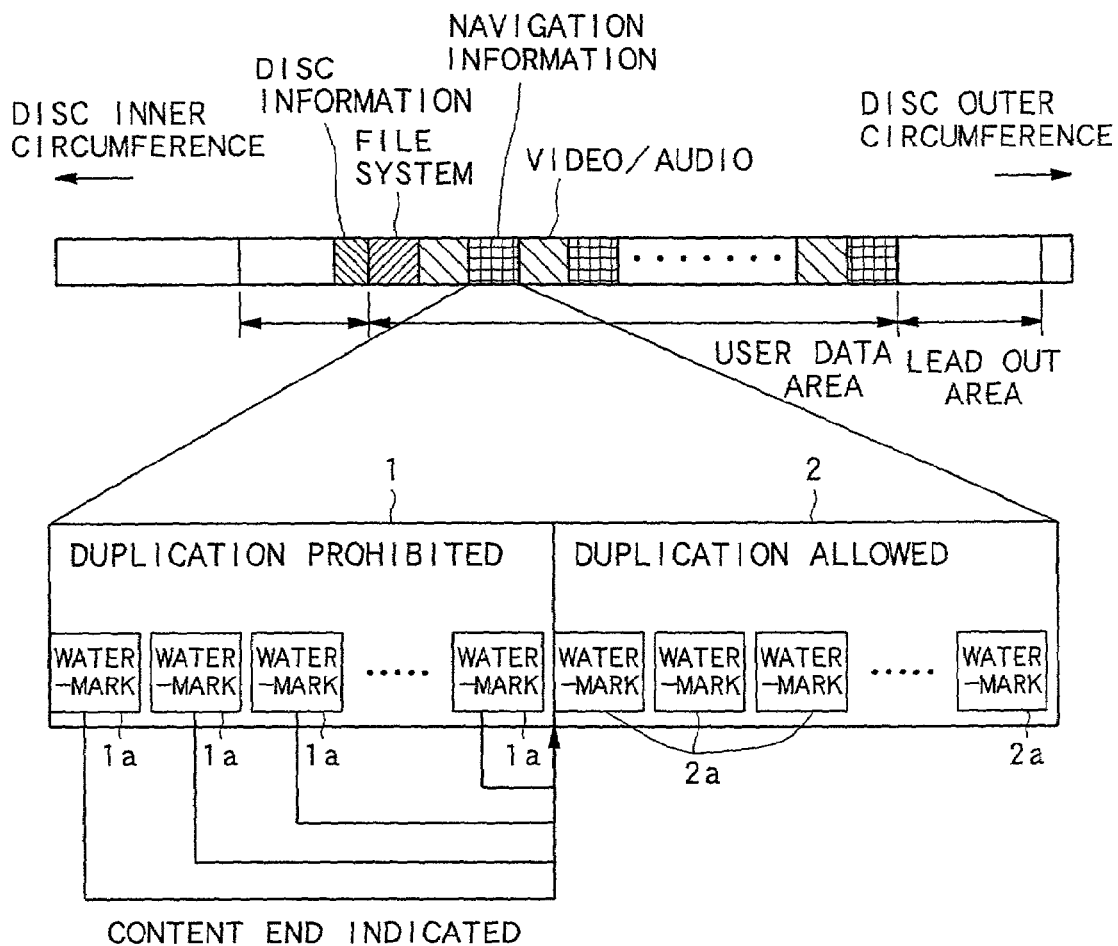

FIG. 6

| BYTE POSITION | CONTENTS |
|---|---|
| 0 | HEADER/CONTROL INFORMATION |
| 1 | i-TH CHANGE POSITION (LEAST SIGNIFICANT 4 BITS)+CONTROL INFORMATION BEFORE AND AFTER THE CHANGE |
| 2-3 | FIRST CHANGE POSITION (MOST SIGNIFICANT 16 BITS) |
| 4 | SECOND CHANGE POSITION (LEAST SIGNIFICANT4 BITS) +CHANGE BEFORE AND AFTER THE CHANGE |
| 5-6 | SECOND CHANGE POSITION (MOST SIGNIFICANT 16 BITS) |
| ⋮ | ⋮ |
| 191-192 | |
| 193-255 | ERROR CORRECTION CODE |

DUPLICATION CONTROLLING METHOD, DUPLICATION CONTROLLING APPARATUS, RECORDING MEDIUM, AND DUPLICATION CONTROLLING PROGRAM EMBODIED ON COMPUTER-READABLE MEDIUM

BACKGROUND OF THE INVENTION

1. Field of the Invention

The present invention relates to an electronic watermark embedding method and the like for embedding an electronic watermark to control the duplication of digital information contents.

2. Description of the Prior Art

Nowadays, digital television broadcast has been realized, so that the delivery of an image through an image digital signal is widely being performed. Moreover, there is being spread also a video recorder for recording an image as digital data onto an optical disc and a magnetic tape. If an image can be recorded as the digital data, it is possible to duplicate an image without deteriorating the quality of the image. Accordingly, from the viewpoint of copyright, it is necessary to limit the duplication of the image.

For example, European Patent Application EP1006722A2 (corresponding to Japanese Patent Application Laid-open No. 2000-173175) discloses a watermark (electronic watermark) technique as one of techniques to limit the duplication of the image by embedding information regarding the duplication limit in the digital image. The watermark is embedded so as to be hidden in the image. Accordingly, the watermark embedded in the image hardly lowers the image quality. Moreover, a person who has received the image having the watermark embedded probably cannot recognize that the watermark is present in the image, and accordingly, it becomes very difficult to remove the watermark from the image.

The aforementioned EP1006722A2 discloses a system using a watermark indicating the prohibition of the duplication and a watermark indicating the allowance of one-generation duplication. Such a system can control the number of times that the duplication is performed, and accordingly, the system does not cause a copyright problem. Further, a person who receives television broadcast can watch a delivered image and without being restricted to a broadcast time.

In this system, when a digital image is supplied to a video recorder, the video recorder checks whether the image has a watermark. If one is present and it indicates to prohibit the duplication, the video recorder does not record the image. Moreover, when no watermark is present or a watermark is present but it indicates the allowance of one-generation duplication, the video recorder decides that the image is allowed to be duplicated and records the image onto an optical disc.

When an image is broadcast from a broadcast station, normally, a plurality of image contents are continuously broadcast. Accordingly, a variety of image contents, each having different image duplication control information, i.e., duplication prohibition, one-generation duplication allowance, duplication allowance, are successively broadcast. For example, the image contents having duplication control information indicating the duplication prohibition may be followed by the image contents of having duplication control information indicating the duplication allowance.

However, check to determine whether a watermark is present and detection of the watermark type switching from one to another require a predetermined period of time (for example, a predetermined time not greater than 10 seconds). Therefore, the image contents switching may not be detected rapidly enough and at a head portion of the subsequent image contents, control information different from an actual one may be recognized.

For example, in a reception apparatus and a reproduction apparatus, there is caused a trouble of mismatching between control information based on a watermark and actual control information in a sector. This disturbs, for example, control of a micro vision signal as copy (duplication) control information to be added to an analog video signal. Moreover, a recording apparatus also has a problem. For example, even after the image contents are switched from those having control information of the duplication prohibition to those having control information of the duplication allowance, a head portion of the subsequent image contents is recognized as in the duplication prohibition and cannot be recorded. Moreover, even if the contents having control information of one-generation duplication allowance are switched to contents having control information of duplication allowance, a watermark of a duplicated state may be embedded to a head portion of the subsequent contents, and then the contents are scrambled. On the contrary, there is a trouble that a head portion of the contents whose duplication is prohibited is recorded.

SUMMARY OF THE INVENTION

It is therefore an object of the present invention to provide a duplication controlling method that can solve the problems caused by a detection delay of control information.

A first aspect of the present invention is directed to a duplication controlling method for controlling duplication by embedding an electronic watermark indicating duplication-related control information into contents comprising digital information, wherein the electronic watermark includes change position information indicating a change position of the contents of the control information.

According to this duplication controlling method, it is possible to recognize a control information change position in advance by reading the watermark. This makes it possible to rapidly keep up with a control information change caused when the contents are switched from one to another for example.

It should be noted that in this Specification, the "change position of the contents of the control information" is a concept including an end of the control information, a start of the control information, and a switching position.

The change position information may indicate an end position of the contents having the electronic watermark.

In this case, the end position of the contents can be recognized in advance by reading the electronic watermark, which makes it possible to rapidly keep up with the control information change at the end of the contents.

The change position information may indicate a position where the contents of the control information indicated by the electronic watermark containing this change position information change to the subsequent contents.

In this case, the position where the control information contents are changed from one to another can be recognized in advance by reading the electronic watermark. Therefore, it is possible to rapidly keep up with the control information switching.

The electronic watermark may contain contents information indicating the contents of the control information which is started from the change position.

In this case, an appropriate processing or operation can be assured in accordance with the contents of the control information which is started from the change position.

A plurality of change positions contained in the electronic watermark may be recorded as a table.

In this case, by reading the table once, it is possible to recognize all the change positions contained in the table. Accordingly, even if the contents are switched to other contents before their end, a necessary processing and operation can promptly be accomplished for the new contents.

The table may contain contents information indicating the contents of the control information which are started from a plurality of the change positions.

In this case, in accordance with the control information contents which are started at the change positions, it is possible to assure an appropriate processing and operation.

A second aspect of the present invention is directed to a duplication controlling apparatus for embedding an electronic watermark indicating control information regarding duplication into the contents comprising digital information. The apparatus is provided with: an embedding device (201) for embedding the electronic watermark into the contents, wherein the electronic watermark contains change position information indicating a change position where the contents of the control information are changed.

In this duplication controlling apparatus, because a control information contents change can be recognized in advance, it is possible to rapidly keep up with the control information change caused when the contents are switched from one to another.

The change position information may indicate an end position of the contents having the electronic watermark.

In this case, the end position of the contents can be recognized in advance by reading the electronic watermark, which makes it possible to rapidly keep up with the control information change at the end of the contents.

The change position information may indicate a position where the contents of the control information indicated by the electronic watermark containing this change position information change to the subsequent contents.

In this case, by reading the electronic watermark, it is possible to recognize in advance, the position where the control information contents are changed from one to another. Thus, it is possible to rapidly keep up with the control information switching.

The electronic watermark may contain contents information indicating the contents of the control information which is started from the change position.

In this case, an appropriate processing or operation can be assured in accordance with the contents of the control information which is started from the change position.

A plurality of change positions contained in the electronic watermark may be recorded as a table.

In this case, it is possible to recognize all the change positions contained in the table by reading the table. Accordingly, even if the contents are switched to other contents before their end, a necessary processing and operation can promptly be accomplished for the new contents.

The table may contain contents information indicating the contents of the control information which is started from a plurality of change positions.

In this case, according to the control information contents which are started from the change positions, it is possible to assure an appropriate processing and operation.

It may be possible to provide an delivery device (210, etc.) for delivering the contents having the electronic watermark embedded by the embedding device (201).

In this case, it is possible to appropriately keep up with a control information change of the contents delivered by the delivery device.

A third aspect of the present invention is directed to a recording medium (DK) having an electronic watermark indicating control information regarding the duplication of contents comprising digital information, wherein the electronic watermark includes change position information indicating a change position of the contents of the control information.

In this duplication controlling apparatus, because a control information contents change can be recognized in advance, it is possible to rapidly keep up with the control information change caused when the contents are switched.

The change position information may indicate an end position of the contents having the electronic watermark.

In this case, the end position of the contents can be recognized in advance by reading the electronic watermark, which makes it possible to rapidly keep up with the control information change at the end of contents.

The change position information may indicate a position where the contents of the control information indicated by the electronic watermark containing this change position information changes to the subsequent contents.

In this case, the position where the control information contents are changed from one to another can be recognized in advance by reading the electronic watermark. Thus, it is possible to rapidly keep up with the control information switching.

The electronic watermark may contain contents information indicating the contents of the control information which is started from the change position.

In this case, an appropriate processing or operation can be assured in accordance with the contents of the control information which is started from the change position.

A plurality of change positions contained in the electronic watermark may be recorded as a table.

In this case, it is possible to recognize all the change positions contained in the table by reading the table. Accordingly, even if the contents are switched to other contents before their end, a necessary processing and operation can promptly be accomplished for the new contents.

The table may contain contents information indicating the contents of the control information which is started from a plurality of change positions.

In this case, in accordance with the control information contents which are started from the change positions, it is possible to assure an appropriate processing and operation.

A fourth aspect of the present invention is directed to a duplication controlling apparatus for performing control in accordance with duplication-related control information embedded in contents comprising digital information. The apparatus is provided with: an electronic watermark read device (107) for reading an electronic watermark; a change position detection device (104) for detecting a change position of the control information; and a control device (115) for modifying the processing of the duplication controlling apparatus when the change position is detected by the change position detection device (104), wherein the electronic watermark contains change position information indicating a change position of the contents of the control information.

According to this duplication controlling apparatus, it is possible to recognize the change position of the contents of the control information in advance when the electronic watermark is read by the electronic watermark read device. Accordingly, when a change position, for example, a switching position of the contents is detected, the processing can rapidly be switched to keep up with the control information change.

The change position information may indicate an end position of the contents having the electronic watermark.

In this case, the end position of the contents can be recognized in advance by reading the electronic watermark, which makes it possible to rapidly keep up with the control information change at the end of the contents.

The change position information may indicate a position where the contents of the control information indicated by the electronic watermark containing this change position information change to the subsequent contents.

In this case, the position where the control information contents are changed from one to another can be recognized in advance by reading the electronic watermark. Thus, it is possible to rapidly keep up with the control information switching.

The change position information contained in the electronic watermark may be recorded as a table indicating a plurality of the change positions.

In this case, it is possible to recognize all the change positions contained in the table by reading the table. Accordingly, even if the contents are switched to other contents before their end, a necessary processing and operation can be accomplished for the new contents.

The table may contain contents information indicating the contents of the control information which is started from a plurality of the change positions.

In this case, in accordance with the control information contents which are started from the change positions, it is possible to assure an appropriate processing and operation.

The electronic watermark may contain contents information indicating the contents of the control information which is started from the change position, and the control device (115) may modify the processing in accordance with the contents information contained in the electronic watermark.

In this case, in accordance with the contents of the control information which is started from the change position, an appropriate processing and operation can be performed.

An reproduction device (112, etc.) for reproducing the contents may be provided, and the reproduction device (112, etc.) may be controlled by the control device (115).

In this case, a change position of the contents of the control information can be recognized in advance by reading the electronic watermark with the electronic watermark read device, and accordingly, the operation of the reproduction device (112, etc.) can be switched upon detection of the contents switch position, which makes it possible to rapidly keep up with the control information.

An recording device (152, 155, 156, etc.) for recording the contents may be provided and the recording device (152, 155, 156, etc.) may be controlled by the control device (115).

In this case, a control information contents change position can be recognized in advance by reading an electronic watermark with the electronic watermark read device, and accordingly, it is possible to switch the operation of the recording device (152, 155, 156, etc.) upon detection of, for example, the contents switch position, thereby enabling to rapidly keep up with the control information change.

An reception device for receiving the contents may be provided, and the reception device (309, etc.) may be controlled by the control device (311).

In this case, a control information contents change position can be recognized in advance by reading the electronic watermark with the electronic watermark read device, and accordingly, the operation of the reception means (309, etc.) can be switched upon detection of a change position such as a contents switch position by the change position detection device, thereby enabling to rapidly keep up with the control information change.

The present invention also provides a program for causing a computer to execute an embedding processing of an electronic watermark indicating duplication-related control information into contents comprising digital information. The program defines a procedure for inserting change position information indicating a control contents change position into the electronic watermark and a procedure for embedding the watermark into the contents.

The change position information may indicate an end position of the contents having the electronic watermark.

In this case, the end position of the contents can be recognized in advance by reading the electronic watermark, which makes it possible to rapidly keep up with the control information change at the end of the contents.

The change position information may indicate a position of switching from the contents of the control information indicated by the electronic watermark containing the change position information, to the subsequent contents.

In this case, the position where the control information contents are changed from one to another can be recognized in advance by reading the electronic watermark. Hence, it is possible to rapidly keep up with the control information switching.

The electronic watermark may contain contents information indicating the contents of the control information which is started from the change position.

In this case, an appropriate processing or operation can be assured in accordance with the contents of the control information which is started from the change position.

The change position information contained in the electronic watermark may be recorded as a table indicating a plurality of the change positions.

In this case, by reading the table, it is possible to recognize all the change positions contained in the table. Accordingly, even if the contents are switched before its end to other contents, a necessary processing and operation can promptly be assured for new contents.

The table may contain contents information indicating the contents of the control information which is started from the plurality of change positions.

In this case, in accordance with the control information contents which are started from the change positions, it is possible to assure an appropriate processing and operation.

It should be noted that reference symbols used in attached drawings are attached to components of the present invention but the present invention is not to be limited to the embodiments in the drawings.

BRIEF DESCRIPTION OF THE DRAWINGS

FIG. 1 is a diagram showing a data layout of an optical disc to which a duplication controlling method according to the present invention is applied;

FIG. 2 is a diagram showing the contents of a watermark to be embedded;

FIG. 6 is a diagram showing an example of a watermark to be embedded into particular contents according to a second embodiment of the present invention;

DETAILED DESCRIPTION OF THE PREFERRED EMBODIMENTS

First Embodiment

Figure 3:
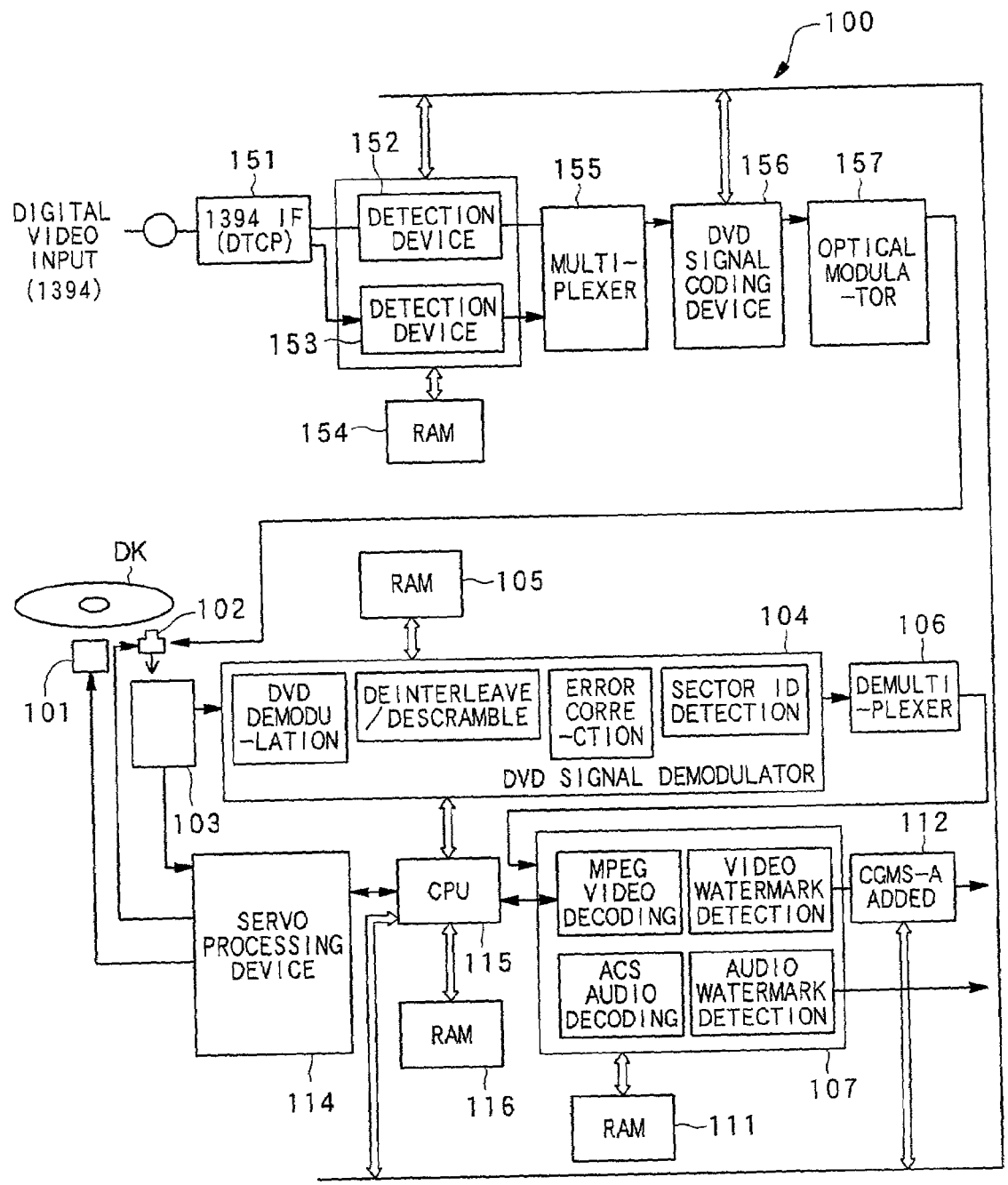
FIG. 3 is a block diagram showing configuration of an information recording/reproducing apparatus to/from an optical disc (DVD) using the duplication controlling method of the present invention.

Description will now be directed to a duplication controlling method according to a first embodiment of the present invention with reference to FIGS. 1 to 5. It should be noted that in this embodiment, image contents are used as contents comprising digital information for example, but the present invention can be applied all the contents comprising digital information such as music.

FIG. 1 shows a data layout of an optical disc to which a duplication controlling method according to the present invention is applied.

As shown in FIG. 1, an optical disc DK has user data area and a lead-out area. In the user, data area, video/audio information and navigation information related to video/audio information are alternately recorded. Moreover, at a head of the user data area, there is provided an area for recording a file system indicating hierarchical structure of the navigation information. Furthermore, a lead-in area is provided immediately before the user data area for recording disc information.

In each of the video/audio information areas, watermarks 1a and 2a are recorded together with video data as the data of contents 1 and contents 2. The watermarks indicate duplication controlling information (control information) for that video data. The watermarks 1a and 2a are repeatedly embedded in the video data.

In the example of FIG. 1, the contents 1 having control information of a duplication prohibition are followed by the contents 2 having control information of duplication allowance. The watermark 1a embedded in the contents 1 indicates control information (duplication allowed) of the contents 1, and the watermark 2a embedded in the contents 2 indicates control information (duplication prohibited) of the contents 2.

FIG. 2 shows a format of information embedded as a watermark. In this example, the information indicated by the watermark is 16-byte data. One byte is embedded in one frame and 16 frames constitute an information item. These information items are embedded as watermarks in all the frames in the contents. As shown in FIG. 2, in this example, the watermark uses 1 byte for header information and control information, 2 bytes as information indicating an end position of current (during reproduction, reception, or recording), 1 byte for indicating control information of the subsequent contents, 3 bytes for copyright information, and remaining bytes for a reserved region and an error correction code.

Thus, in the first embodiment, the end position of the current contents and control information of the subsequent contents are recorded as a watermark. Accordingly, during reproduction, reception, or recording of the contents, it is possible to recognize in advance the timing for switching to the subsequent contents and the control information of the subsequent contents. That is, simultaneously with switching to the subsequent contents, it is possible to assure a correct operation according to the control information of the subsequent contents.

It should be noted that the contents end position can be defined by an address in the case of a package medium for example, but the present invention can be applied to other than the package medium. For example, in the case of broadcast medium, the contents end the position can be defined by a time stamp.

FIG. 3 is a block diagram showing configuration of an information recording/reproducing apparatus corresponding to the duplication controlling method of the present invention.

The information recording/reproducing apparatus 100, as a reproduction system, is provided with: a drive device 101 for an optical disc DK; an optical head 102 for recording/reproducing information; a head amplifier 103 for amplifying an output signal of the optical head 102; a DVD demodulator 104 for performing demodulation, deinterleaving, descrambling, error correction, sector ID detection according to a DVD format; an RAM 105 for storing upon occasion, necessary data for DVD signal demodulation; a demultiplexer 106 for receiving an output signal from the DVD signal demodulator 105; a watermark detection block 107 which receives an output signal from the demultiplexer 106 and performs MPEG decoding of a video signal and an audio signal and which detects a video watermark and an audio watermark; an RAM 111 for storing the watermark detected; a signal overlap block 112 for overlapping a micro vision signal of CGMS-A type on the analog video output signal from an MPEG video recorder 107; a servo processing device 114 for controlling optical head focusing, tracking, and rotation speed of the optical disc DK; a CPU 115 for controlling the respective components of the information recording/reproducing apparatus 100; and an RAM 116 for storing upon occasion, data necessary for control by the CPU 115.

Moreover, the information recording/reproducing apparatus 100, as a recording system, is provided with: an interface (1394 interface) 151 for receiving a digital video signal; a detection/update device 152 for detecting/updating a video watermark in a video output signal from the interface 151; a detection/update device 153 for detecting/updating an audio watermark in an audio output signal from the interface 151; an RAM 154 for storing watermark detected; a multiplexer 155 for multiplexing the video output signal and the audio output signal from the detection/update devices 152 and 153; a DVD signal coding device 156 for performing a code processing based on the DVD format; and an optical demodulator 157 for modulating an output signal from the DVD coding device 156 and outputting the demodulated signal to the optical head 102.

Figure 4:
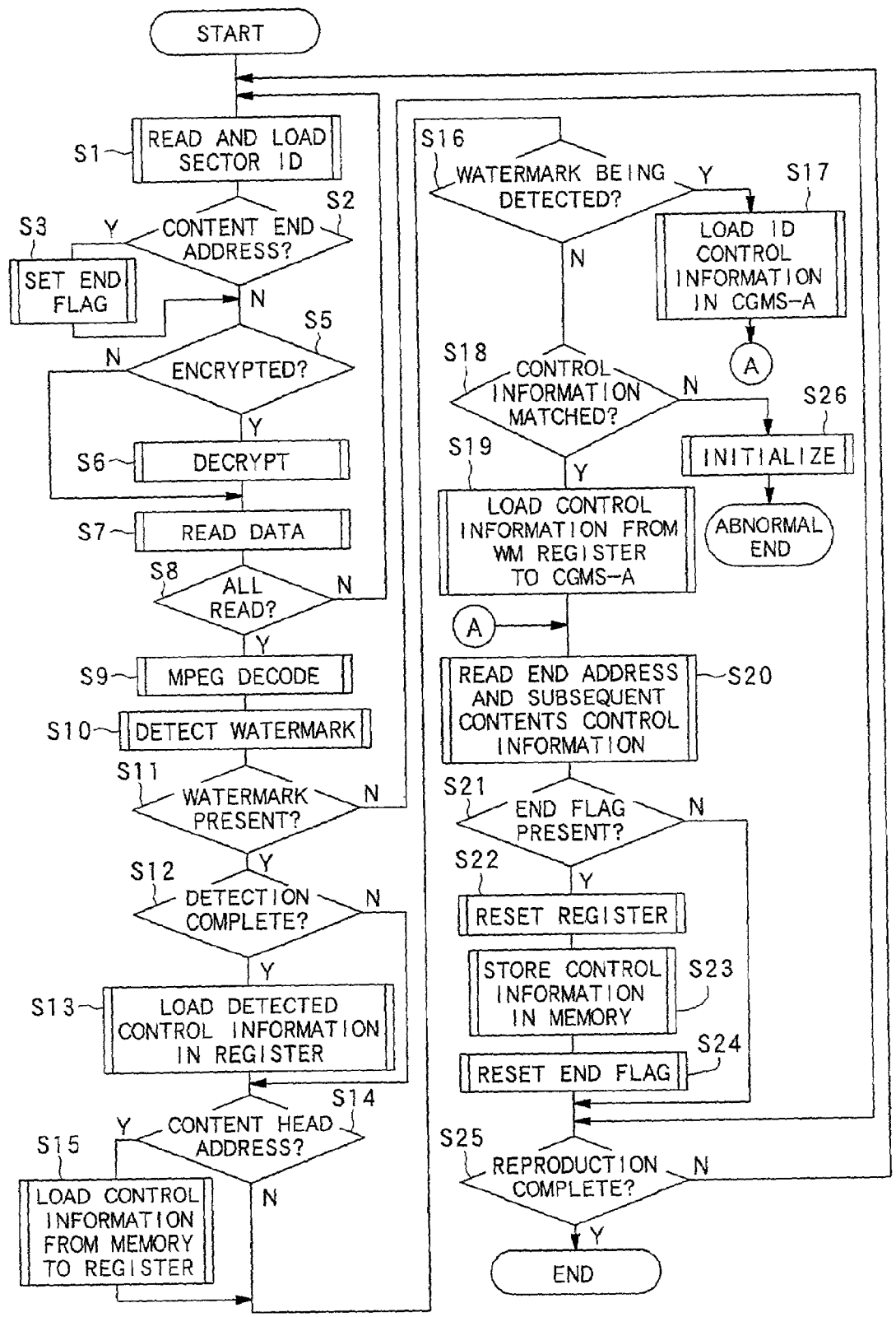
FIG. 4 is a flowchart showing reproduction procedure in the information recording/reproducing apparatus.

FIG. 4 is a flowchart showing an example of a reproduction procedure in the information recording/reproducing apparatus 100.

In FIG. 4, in step S1 a sector ID is detected and loaded. In step S2, according to the sector ID detection result in step S1, it is determined whether an end address of the contents which are being reproduced has been detected or not. If the result of the determination is affirmative, then the processing goes to step S3, and if the result of the determination is negative, then the processing goes to step S4. In step 3, an end flag is set to indicate that the contents end address has been detected, and the processing goes to step 5.

In step 5 it is determined whether the data is encrypted or not. If the result of the determination is affirmative, the processing goes to step S6 where decryption is performed, and the processing goes to step S7. If in step S5 it is determined that the data is not encrypted, then the processing directly goes to step S7.

In step S7, data is read, and in step S8, it is determined whether all the necessary data (data for one sector) have been read out. If the result of the determination is affirmative, the processing goes to step S9. If the result of the determination is negative, then the processing goes back to step S1.

In step S9 MPEG decoding is performed and in step S10 a watermark is detected. Next, in step S10 it is determined whether any watermark has been detected (or being detected) in step S10. If the result of the determination is affirmative, the processing goes to step S12. If the result of the determination is negative, then the processing directly goes to step S25.

In step S12 it is determined whether a watermark has been detected. If the result of the determination is affirmative, then the processing goes to step S13. If the result of the determination is negative, then the processing goes to step S14. In step S13, the detected control information is loaded on a register for watermarks, and the processing goes to step S14.

Next, in step S14 it is determined whether a head address of the contents being reproduced is detected according to the sector ID detection result in step S1. If the result of the determination is affirmative, the processing goes to step S15, and if the result of the determination is negative, then the processing goes to step S16. In step S15, the contents of contents control information stored in a memory in step S23 (which will be detailed later) are loaded in the WM (watermark) register and the processing goes to step S16. It should be noted that various processes in this apparatus are performed according to the control contents loaded in step S15.

In step S16 it is determined whether a watermark is being detected. If the result of the determination is affirmative, the processing goes to step S17 and if the result of the determination is negative, then the processing goes to step S18. In step S17, control information in the sector ID is set in the signal overlap block 112 (FIG. 3) and the processing goes to step S20. Accordingly, during a period of time from a reproduction start to a watermark detection, the signal overlap block 112 is not set and the analog video signal does not enter the duplication allowance.

In step 18 it is determined whether the control information contents stored in the WM register in step S13 or step S15 coincides with the sector ID control information of the sector which is being reproduced and has been read out. If the result of the determination is affirmative, the processing goes to step S19 and if the result of the determination is negative, then the processing goes to step S25. In step S25, it is assumed that the control information in the ID might have been altered and a predetermined initialization process is executed, thereby terminating the processing shown in FIG. 4.

In step S19, the control information stored in the WM register is loaded in the signal overlap block 112. Next, in step S20 the end position of the contents which are being reproduced and the contents of the control information of the subsequent contents are read from the watermark. Next, in step S21 it is determined whether the end flag (step S3) has been set. If the result of the determination is affirmative, the processing goes to step S22 and if the result of the determination is negative, then the processing goes to step S24.

In step S22, the contents of the control information in the WM register is reset (cancelled out of a storage), and in a subsequent step S23 the contents of the control information of the subsequent contents which have been read out in step S20 is loaded in a memory.

In step S24, the end flag is reset.

Next, in step S25 it is determined whether reproduction is complete. If the result of the determination is affirmative, the processing shown in FIG. 4 is terminated and if the result of the determination is negative, then the processing goes back to step S1.

Thus, in the processing of FIG. 4, an end address of the contents which are being reproduced and control information of the subsequent contents are read out (step S20). Upon detection of an end flag which has been set by the end address of the contents (step S21: Yes), the WM register is cleared (step S22) and control information of the subsequent contents is loaded in the memory (step S23). Upon detection of a head address of the subsequent contents (step S14: Yes), the control information of the contents which has been loaded in the memory is loaded in the WM register (step S15), thereby controlling the signal overlap block 112 (step S19). Accordingly, without being affected from a delayed detection of a watermark and it is possible to add a correct micro vision signal corresponding to the contents, to an analog video signal, as the contents change from one to another.

Figure 5:
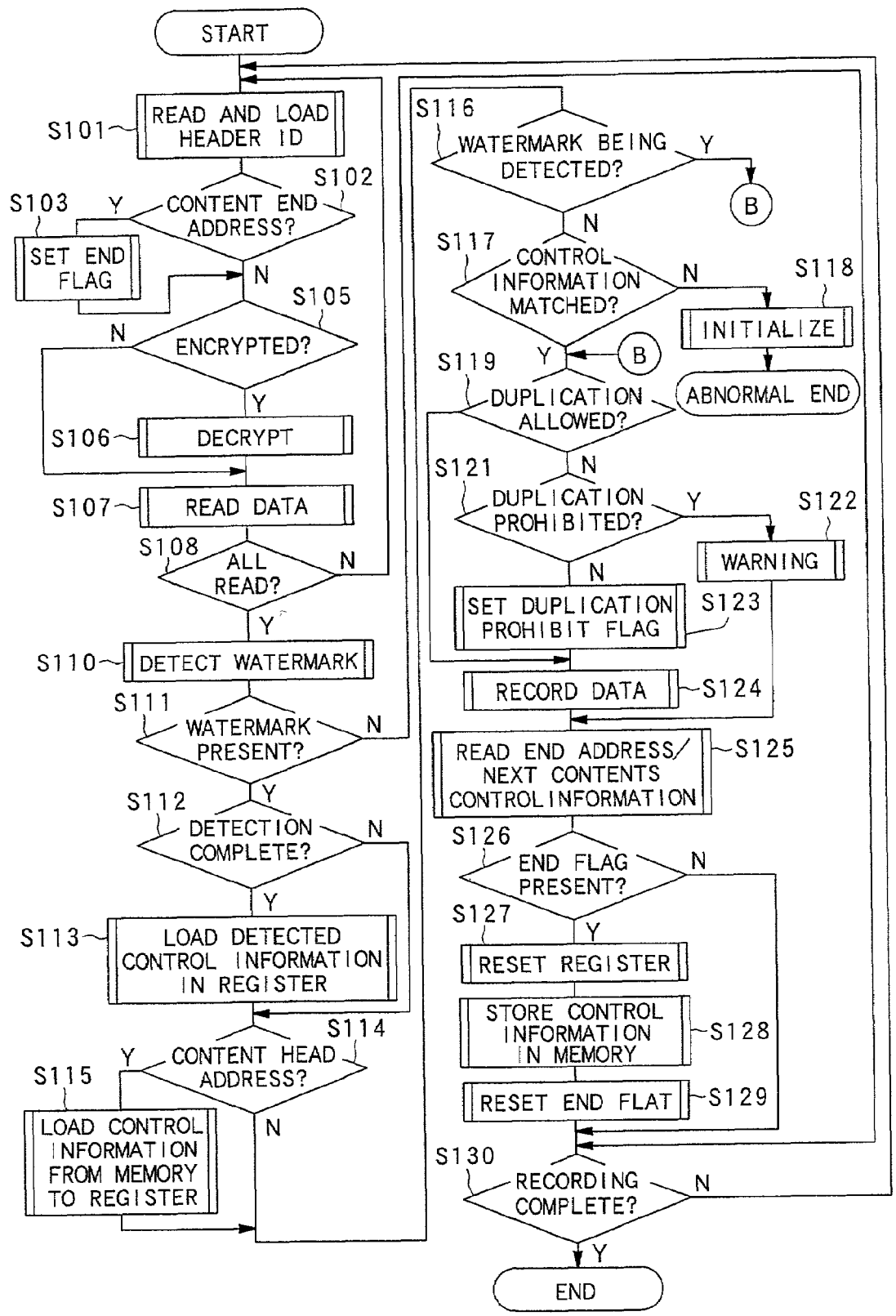
FIG. 5 is a flowchart showing recording procedure in the information recording/reproducing apparatus.

FIG. 5 is a flowchart showing an example of recording procedure in the information recording/reproducing apparatus 100.

In FIG. 5, in step S101 a header ID is detected and loaded. In step S102, according to the header ID detection result in step S101, it is determined whether an end address of the contents which are being recorded as digital video data has been detected. If the result of the determination is affirmative, the processing goes to step S103. If the result of the determination is negative, the processing goes to step S104. In step S103 an end flag is set to indicate that the contents end address has been detected, and the processing goes to step S105.

In step 105 it is determined whether the data is encrypted. If the result of the determination is affirmative, the processing goes to step S106, where the data is decrypted, and the processing goes to step S107. If in step S105 it is determined that the data is not encrypted, the processing goes to step S107.

In step 107, the data is read out and in step S108 it is determined whether all the necessary data (data for one sector) have been read out. If the result of the determination is affirmative, the processing goes to step S110. If the result of the determination is negative, the processing goes back to S101.

Subsequently, in step S110 a watermark is detected. It should be noted that in the case that the contents to be recorded have been subjected to MPEG data compression, MPEG decoding is executed prior to step S110. Next, in step S111 it is determined whether a watermark has been detected (including a state of being detected) in step S110. If the result of the determination is affirmative, the processing goes to step S112 and if the result of the determination is negative, then the processing goes to step S124.

In step S112 it is determined whether a watermark was able to be detected. If the result of the determination is affirmative, the processing goes to step S113 and if the result of the determination is negative, then the processing goes to step S114. In step S113, the detected control information is loaded in the WM register and the processing goes to step S114.

Next, according to the header ID detection result in step S101, in step S114 it is determined whether the contents head address has been detected. If the result of the determination is affirmative, the processing goes to S115 and if the result of the determination is negative, then the processing goes to step S116. In step S115, control information stored in a memory in step S128 (which will be detailed later) is loaded in the WM register and the processing goes to S116. It should be noted that various processes are executed in the present apparatus according to the control information loaded in step S115.

In step S116 it is determined whether a watermark is being detected. If the result of the determination is affirmative, the processing goes to step S119, and if the result of the determination is negative, then the processing goes to step S117.

In step S117 it is determined whether the control information stored in the WM register in step S113 or S115 coincides with the control information of the sector which is being recorded. If the result of the determination is affirmative, the processing goes to step S119, and if the result of the determination is negative, then the processing goes to step S118. In step S118, a predetermined initialization is executed which is executed when an abnormal operation is detected, thereby terminating the processing shown in FIG. 5.

In step S119 it is determined whether the contents to be recorded are in the duplication allowance. If the result of the determination is affirmative, the processing goes to step S124, and if the result of the determination is negative, the processing goes to step S121. In step S121 it is determined whether the contents to be recorded are in the duplication prohibition or in the further duplication prohibition (one-generation duplication allowed but already recorded once). If the result of the determination is affirmative, the processing goes to step S122, and if the result of the determination is negative, then the processing goes to step S123. It should be noted that in step S123 the result of the determination becomes negative when current recording is a first generation recording of the contents in the one-generation duplication allowance. In step S122 warning display is performed and the processing goes to S125.

In step S123 a flag prohibiting further duplication is set and the processing goes to step S124.

It should be noted that when this flag is set, the aforementioned detection/update device 152, 153 (FIG. 3) update the watermark by embedding a second watermark into each of the input signals. The second watermark indicates that duplication (copying) has been performed once. Moreover, the DVD signal coding device 156 performs a predetermined encryption of the input signals.

In step S124, contents data is recorded and the processing goes to step S125.

Next, in step S125 the contents of the watermark, i.e., an end position of the contents which are being recorded and control information of the subsequent contents are read out. Next, in step S126 it is determined whether the end flag (step 103) has been set. If the determination is affirmative, the processing goes to step S127, and if the result of the determination is negative, the processing goes to step S130.

In step S127 the contents of the control information in the WM register are reset (cancelled out of a storage), and then in step S128 the contents of control information of the next contents which have been read out in step S125 is loaded in the memory. In step S129, the end flag is reset.

Next, in step S130 it is determined whether the recording is complete. If the result of the determination is affirmative, the processing shown in FIG. 5 is terminated. If the result of the determination is negative, then the processing goes back to step S101.

Thus, in the processing shown FIG. 5, by reading out an end address of the contents which are being recorded and control information of the subsequent contents (step S125) and detecting the end flag which has been set at the recorded contents end address (step S126: Yes), the WM register is cleared (step S127) and control information of the subsequent contents is loaded in the memory (step 128). When a head address of the subsequent contents is detected (step S112: Yes), control information of the subsequent contents which have been stored in the memory is loaded in the WM register (step S113), enabling to recognize the control information (step S119, step S121). Accordingly, without being affected by a watermark detection delay, control information corresponding to the contents can immediately be recognized as the contents are switched from one to another.

Embodiment 2

While in the first embodiment, each of the contents watermarks contains an end position of the contents and control information of the subsequent contents, in the second embodiment, a particular contents watermark contains a change position of control information and control information contents are intensively recorded as a table.

FIG. 6 shows an example of information contained as a watermark embedded into particular contents according to the second embodiment.

In the example of FIG. 6, as a watermark, following information is recorded: a control information change position ("first change position" in FIG. 6) corresponding to switching from the current contents (first contents) to the subsequent contents (second contents) and control information before and after the change; a control information change position ("second change position" in FIG. 6) corresponding to switching from the second contents to the subsequent contents (third contents) and control information before and after the change position. It should be noted that FIG. 6 shows a table example when the table can be expressed in 256 bytes. Control information of copyright and control information of the current contents (which is being reproduced, being received, or being recorded) are contained in each of the contents in the same way as the first embodiment.

In the case of a package medium, such a table includes control information change positions corresponding to switching positions of all the contents recorded in that medium and is embedded as a watermark with a high intensity into a position which is surely read in upon disc start (such as a title # and chapter # recorded in the disc, a menu screen for selecting a caption language, and a head portion of the first contents (title #1) to be reproduced). It should be noted that in addition to this table, control information for each of the contents is embedded so as to protect copyright.

Moreover, when delivering the contents by broadcast, the table contains control information change positions corresponding to switching positions of the contents of a predetermined range and control information before and after the changes, and the table is embedded as a watermark with a comparatively long cycle.

In the case of package medium, a control information change position can be defined by an address. Moreover, when delivering software by broadcast, the control information change position can be defined by a time stamp.

In this case, the second change position and subsequent change positions only need to indicate a relative time stamp from the time stamp where the watermark of the first change position is embedded.

Figure 7:
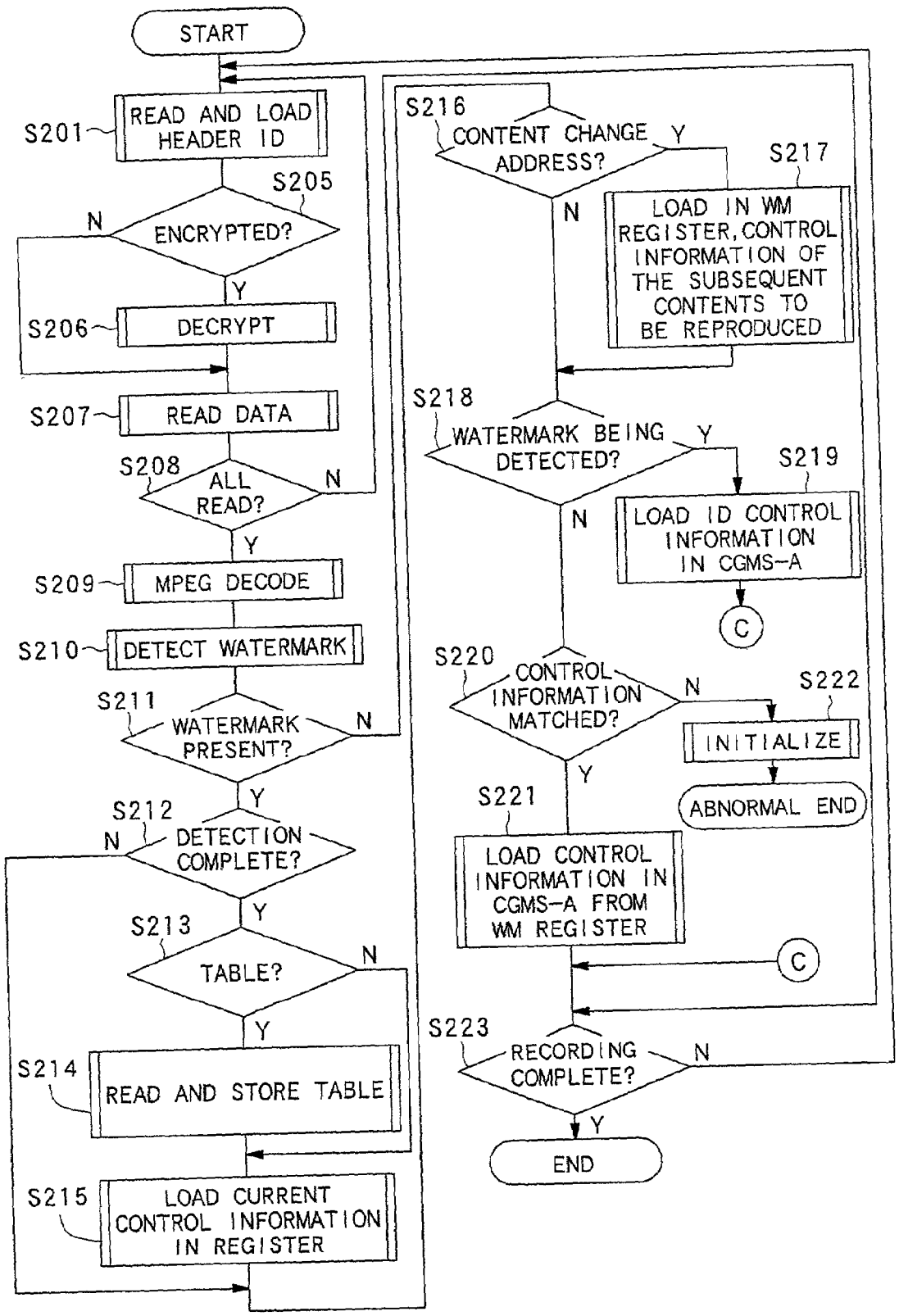
FIG. 7 is a flowchart showing a reproduction procedure performed by the information recording/reproducing apparatus for reproducing a package medium having a table.

FIG. 7 is a flowchart showing an example of operation procedure when reproducing a package medium having a table as shown in FIG. 6 by the information recording/reproducing apparatus 100 (FIG. 3).

In step S201 of FIG. 7, a sector ID is detected and set.

In step S205, it is determined whether data is encrypted. If ther result of the determination is affirmative, the processing goes to step S206, where decryption is executed and then the processing goes to step S207. If step S205 decides that the data is not encrypted, the processing goes to step S207.

In step S207, the data is read out and in step S208 it is determined whether all the necessary data (data of one sector) have been read out. If the result of the determination is affirmative, the processing goes to step S209, and if the result of the determination is negative, the processing goes back to step S201.

In step S209, MPEG decoding is executed and in step S210, a watermark is detected. Next, in step S211, it is determined whether a watermark has been detected (including a state that a watermark is being detected). If the result of the determination is affirmative, the processing goes to step S212, and if the result of the determination is negative, then the processing goes to step S224.

In step S212 it is determined whether a watermark has been detected. If the result of the determination is affirmative, the processing goes to step S213, and if the result of the determination is negative, then the processing goes to step S216. In step S213 it is determined whether the watermark detected is one shown in the table of FIG. 6. If the result of the determination is affirmative, the processing goes to step S214, and if the result of the determination is negative, then the processing goes to step S215. In step S214, currently reproduced control information and the table are read in and stored. Then, the processing goes to step S215, where the currently reproduced control information is loaded in the WM register and the processing goes to step S216.

Next, according to the sector ID detection result in step S201, in step 216 it is determined whether an address at which the contents being reproduced are changed has been detected. If the result of the determination is affirmative, the processing goes to step S217, and if the result of the determination, then the processing goes to step S218. In step S217, from the table stored in step S214, control information of the next contents to be reproduced is loaded in the WM register and the processing goes to step 218. It should be noted that various processes in the present apparatus are performed according to the control information set in step S217.

In step S218 it is determined whether a watermark is being detected. If the result of the determination is affirmative, the processing goes to S219, and if the result of the determination is negative, then the processing goes to step S220. In step S219, the control information of the sector ID is set in the signal overlap block 112 (FIG. 3) and the processing goes to step S223. Accordingly, during a period of time from the reproduction start to the watermark detection, the signal overlap 112 is not set and the analog video signal does not enter the duplication allowance.

In step 220 it is determined whether the control information stored in the WM register in step S215 or step S217 coincides with the control information of the sector which has been read out and is being reproduced. If the result of the determination is affirmative, the processing goes to step S221, and if the result of the determination is negative, then the processing goes to step S222. In step S222, assuming that the ID control information has been altered, a predetermined initialization is executed, thereby terminating the processing of FIG. 7.

In step S219, the control information stored in the WM register is set in the signal overlap block 112.

Next, in step S223 it is determined whether the reproduction is complete. If the result of the determination is affirmative, the processing of FIG. 7 is terminated, and if the result of the determination is negative, the processing goes back to step S201.

Thus, in the processing shown in FIG. 7, the contents of the table show in FIG. 6 are stored (step S214) and when an contents change address is detected (step S216: Yes), next control information to be reproduced is fetched from the stored table and set in the WM register (step S217) so as to control the signal overlap block 112 (step S221). Accordingly, without being affected by a watermark detection delay, a correct macro vision signal corresponding to the current contents which is switched to the subsequent contents can be added to the analog video signal. Furthermore, since the table is stored, even if it transfers to the reproduction by skipping some contents, the control information of the contents is recognized simultaneously with the reproduction of that contents, and a correct micro vision signal can immediately be added to the analog video signal.

Figure 8:
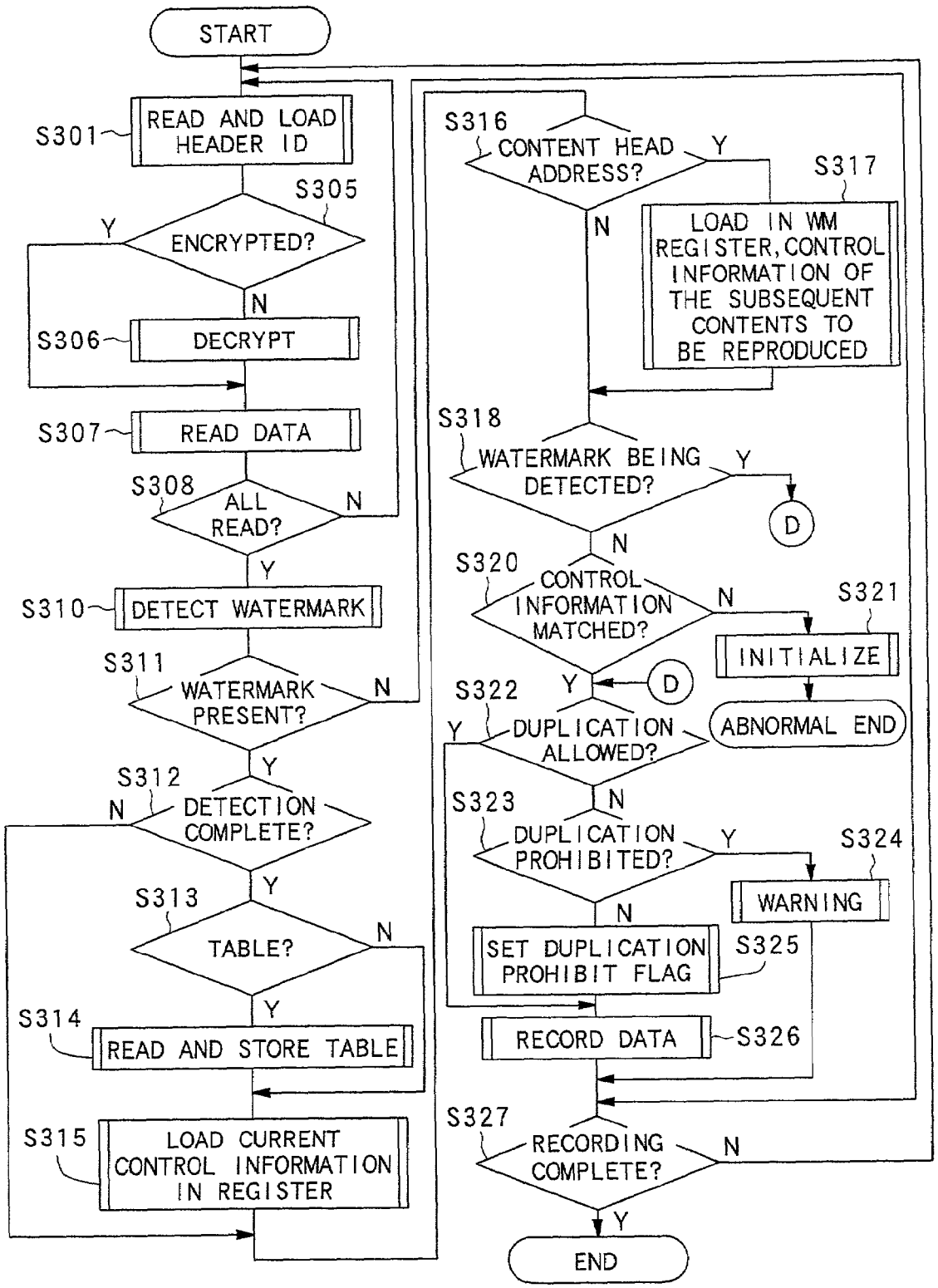
FIG. 8 is a flowchart showing a recording procedure performed by the information recording/reproducing apparatus for reproducing a package medium having a table.

FIG. 8 is a flowchart showing an example of operation procedure when recording a package medium having the table of FIG. 6 by the information recording/reproducing apparatus 100 (FIG. 3).

In step S301 of FIG. 8, a header ID is detected and set.

In step S305 it is determined whether data is encrypted. If the result of the determination is affirmative, the processing goes to step S306 where decryption is executed and the processing goes to step S307. If in step S305 it is determined that data is not encrypted, the processing goes to step S307.

In step S307, data is read and then in step S308 it is determined whether all the necessary data (data of one sector) have been read out. If the result of the determination is affirmative, the processing goes to step S10, and if the result of the determination is negative, the processing goes back to step S301.

Subsequently, in step S310, a watermark detection is executed. It should be noted that when the contents to be recorded have been subjected to MPEG data compression, MPEG decoding is executed prior to step S310. Next, in step S311 it is determined whether a watermark has been detected (including a state that a watermark is being detected). If the result of the determination is affirmative, the processing goes to step S312, and if the result of the determination is negative, then the processing goes to step S324.

In step S312 it is determined whether a watermark was able to be detected. If the result of the determination is affirmative, the processing goes to step S313, and if the result of the determination is negative, the processing goes to step S316. In step S313 it is determined whether the watermark detected is one shown in the table of FIG. 6. If the result of the determination is affirmative, the processing goes to step S314, and if the result of the determination is negative, then the processing goes to step S315. In step S314, together with the control information which is being recorded, the table of FIG. 6 is read in and stored, and the processing goes to step S315. In step S315, the control information which is being recorded is loaded in the WM register and the processing goes to step S316.

Next, according to the header ID detection result in step S301, in step S316 it is determined whether a head address of the contents which are being recorded has been detected. If the result of the determination is affirmative, the processing goes to step S317, and if the result of the determination, then the processing goes to step S318. In step S317, control information of the subsequent contents to be recorded is loaded in the WM register from the table stored in the preceding step S314, and the processing goes to S318. It should be noted that various processes in the present apparatus are performed according to the control information set in step S317.

In step S318 it is determined whether a watermark is being detected. If the result of the determination is affirmative, the processing goes to step S322, and if the result of the determination is negative, then the processing goes to step S320.

In step S320 it is determined whether the control information stored in the WM register in step S315 or step S317 coincides with the control information of the sector which is being recorded. If the result of the determination is affirmative, the processing goes to step S322, and if the result of the determination is negative, then the processing goes to step S321. In step S321, a predetermined initialization process is executed, assuming that the ID control information has been altered.

In step S322 it is determined whether the contents to be recorded are in the duplication allowance according to the ID control information when the watermark is being detected or according to the control information in the watermark register when the watermark has been detected. If the result of the determination is affirmative, the processing goes to step S326, and if the result of the determination is negative, then the processing goes to step S323. In step S323 it is determined whether the contents to be recorded are in the duplication prohibition or further duplication prohibition (one-generation duplication is allowed but already recorded once) according to the control information like the determination in step S322. If the result of the determination is affirmative, the processing goes to step S324, and if the result of the determination is negative, the processing goes to step S325. It should be noted that the result of the determination in the step S325 in negative when a current recording is the first generation recording for the contents. In step S324, a warning message is displayed and control is passed to step S327.

In step S325 flag indicating that further duplication is prohibited is set and the processing goes to step S326.

It should be noted that when this flag is set, the aforementioned detection/update devices 152 and 153 (FIG. 3) embed into input signals a second watermark indicating that duplication (copying) has been performed once, so as to update the watermark. Moreover, the DVD signal coding device 156 executes a predetermined encryption process to the input signals.

In step S326, the contents data is recorded and the processing goes to step S327.

Next, in step S327 it is determined whether the recording is complete. If the result of the determination is affirmative, the processing of FIG. 8 is terminated, and if the result of the determination is negative, then the processing goes back to step S301.

Thus, in the processing shown in FIG. 8, the table of FIG. 6 is stored (step S314) and upon detection of a contents change address (step S316: Yes), a next control information to be recorded is fetched from the stored table and loaded in the WM register (step S317) and the control information is checked (step S322, step S323). Accordingly, without being affected by a watermark detection delay, correct control information corresponding to the change of the contents can be immediately obtained.

Figure 9:
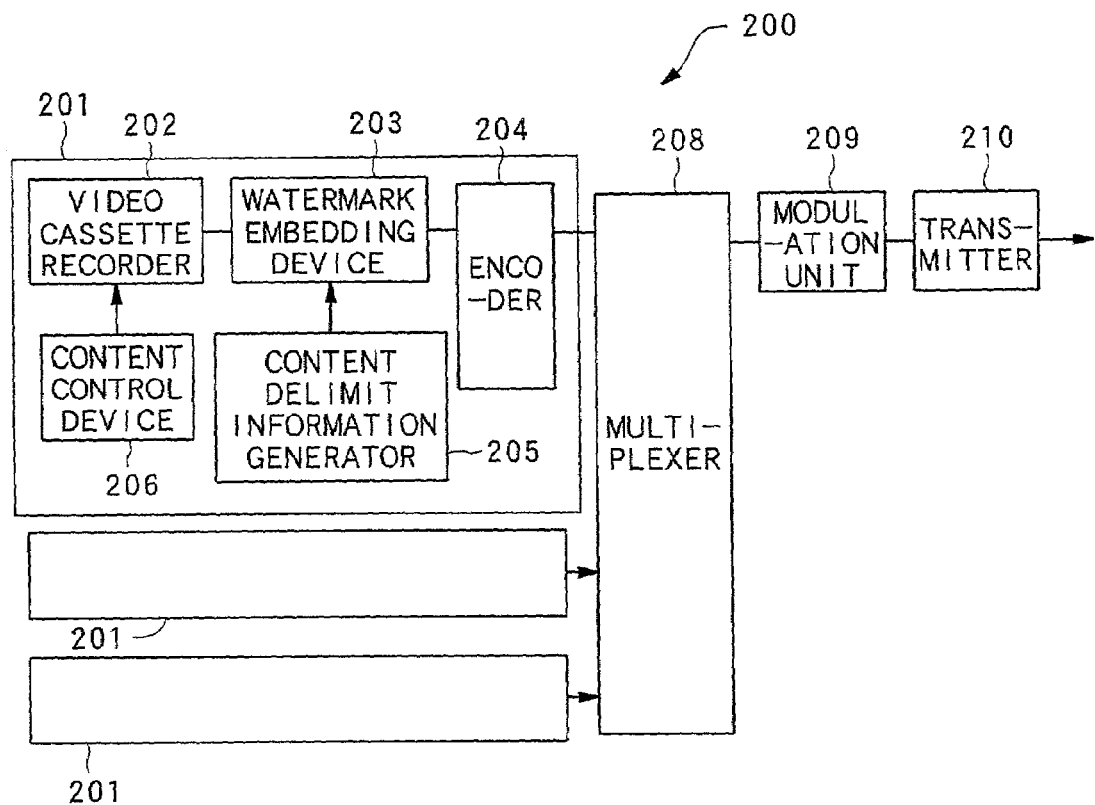
FIG. 9 is a block diagram showing a configuration example of a transmission apparatus of a broadcast station.

FIG. 9 is a block diagram showing a configuration example of a transmission apparatus of a broadcast station capable of embedding a watermark into the broadcast contents according to the duplication controlling method of the present invention.

The transmission apparatus 200 shown in FIG. 9 is provide with: a plurality of watermark embedding blocks 201; a multiplexer 208 for embedding a header and multiplexing an output signal from the watermark embedding block 201; a modulation block for modulating an output signal from the multiplexer 208 and, if necessary, scrambling an image; and a transmitter 210 for amplifying and outputting an output signal from the modulation block 209.

As shown in FIG. 9, the watermark embedding block 201 includes a video cassette recorder 202 for reproducing a video tape having the recorded contents; a watermark embedding device 203 for embedding a watermark into an output signal (image signal) from the video cassette recorder; an encoder 204 for executing data compression of a video signal and an audio signal of the contents output from the video cassette recorder, using the MPEG method and the AC3 method, respectively; a contents delimiting information generator 205 for outputting an end, a head, and a switching timing of the contents as well as the contents of the control information of the contents; and a contents control device 206 for controlling the video cassette recorder 202 and the contents delimiting information generator 205.

In the watermark embedding block 201, a watermark is embedded by the watermark embedding device 203 into a video signal and an audio signal of the contents output from the video cassette recorder 202. The contents delimiting information generator 205 output to the watermark embedding device 203 a time stamp indicating a contents delimiting timing and information indicating the contents of control information. Thus, the time stamp indicating the contents delimiting timing and the watermark having the information indicating the contents of the control information are added to a video signal or an audio signal.

By using the transmission apparatus of FIG. 9, for example, it is possible to embed, into the contents, a watermark indicating the end of the contents and the contents of the control information of the subsequent contents as in the first embodiment, and to embed as a watermark a table containing a plurality of control information change positions and the contents of the control information, into particular contents as in the second embodiment before broadcasting a plurality of contents continuously or at a predetermined interval.

The processing in the transmission apparatus 200 can be executed by a computer (such as a contents control device) according to a readable software program. In this case, the contents delimiting information generator 205, which is controlled by the contents control device 206, can be served as an inserting device for inserting change position information indicating a change position of the contents of the control information into a watermark. The watermark embedding device 203, which is controlled by the contents control device 206, can be served as an embedding device for embedding a watermark into the contents.

Figure 10:
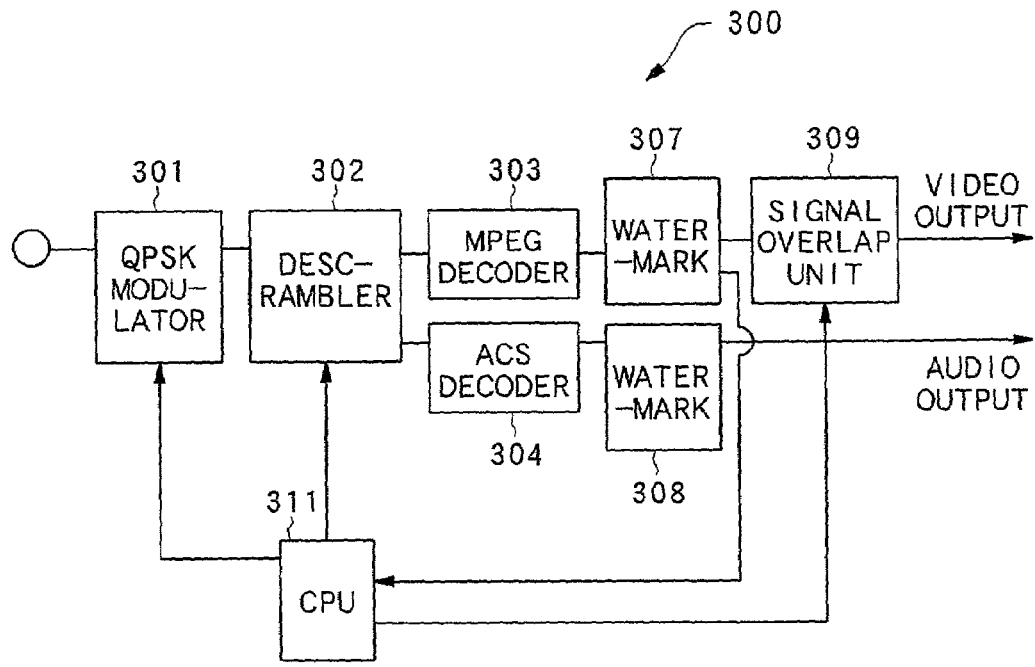
FIG. 10 is a block diagram showing a configuration example of a reception apparatus for receiving contents having an embedded watermark.

FIG. 10 is a block diagram showing a configuration example of a reception apparatus for receiving the contents having a watermark embedded according to the duplication controlling method of the present invention.

The reception apparatus shown in FIG. 10 is provided with: a demodulator 301 for demodulating a received signal which has been modulated by 4-phase modulation method; a descrambler 302 for removing a scramble from an output signal of the demodulator; an MPEG decoder 303 which is fed with an image signal from the descrambler 302; an AC3 decoder 304 fed with a voice signal from the descrambler 302; a header extracting block for extracting header information from an output signal of the descrambler 302; a watermark detection block 307 for detecting a watermark in the MPEG-decoded image signal; watermark detection block 308 for detecting a watermark in the AC3-decoded voice signal; a signal overlap block 309 for overlapping an output signal from the watermark detection block 307 with a macro vision signal of CGMS-A method; and a CPU 311 for controlling the respective blocks of the reception apparatus 300.

In this reception apparatus 300, it is possible to obtain a time stamp indicating a contents delimiting timing and information indicating the contents of control information by detecting a watermark embedded in a video signal and an audio signal of the contents, using the watermark detection device 307. This makes it possible to rapidly control the signal overlap block 309 according to the contents delimiting timing. As an actual processing, the procedures shown in FIG. 4, FIG. 5, FIG. 7 or FIG. 8 are performed to pre-detect a contents delimiting or control information change timing, the contents of the control information switched from one to another, and the like. Thus, it is possible to detect the end of the contents and the contents of the control information of the subsequent contents as in the first embodiment and to read a table containing a plurality of control information change positions and the contents of control information, and the like.

It should be noted that the present invention is not limited to the aforementioned embodiments. For example, while in the example of FIG. 2, a watermark indicates an end position of the current contents as information of a control information contents change position, it is also possible to indicate a head position of the subsequent contents.

As has been described above, according to the present invention, an electronic watermark including change position information indicating a control information contents change position is embedded into contents comprising digital information. Accordingly, upon reproduction, recording, or reception, the electronic watermark can be read out so as to recognize a control information contents change position in advance. Consequently, it is possible to rapidly keep up with control information change occurring when the contents are switched from one to another.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-64008 filed on Mar. 7, 2001 including the specification, claims, drawings and summary is incorporated herein by reference in its entirety.

What is claimed is:

1. A duplication controlling method for controlling duplication by embedding an electronic watermark indicating control information regarding duplication into contents comprising digital information and detecting the electronic watermark before the duplication is executed, wherein the electronic watermark includes change position information indicating a change position of contents of the control information, wherein the change position information indicates an end position of the contents in which the electronic watermark is embedded, wherein the electronic watermark indicates control information of contents subsequent to the end position of the contents in which the electronic watermark is embedded.

2. The duplication controlling method according to claim 1, wherein the change position information indicates a position where the contents of the control information indicated by the electronic watermark containing this change position information change to the subsequent contents.

3. The duplication controlling method according to claim 1, wherein the electronic watermark contains contents information indicating the contents of the control information which is started from the change position.

4. The duplication controlling method according to claim 1, wherein change position information indicating a plurality of change positions contained in the electronic watermark is recorded as a table.

5. The duplication controlling method according to claim 4, wherein the table contains contents information indicating the contents of the control information which are started from a plurality of the change positions.

6. A duplication controlling apparatus for controlling duplication by embedding an electronic watermark indicating control information regarding duplication into contents comprising digital information, comprising an embedding device for embedding the electronic watermark into the contents; and a detecting device for detecting the electronic watermark before the duplication is executed, wherein the electronic watermark contains change position information indicating a change position where the contents of the control information are changed, wherein the change position information indicates an end position of the contents in which the electronic watermark is embedded, wherein the electronic watermark indicates control information of contents subsequent to the end position of the contents in which the electronic watermark is embedded.

7. The duplication controlling apparatus according to claim 6, wherein the change position information indicates a position where the contents of the control information indicated by the electronic watermark containing this change position information change to the subsequent contents.

8. The duplication controlling apparatus according to claim 6, wherein the electronic watermark contains contents information indicating the contents of the control information which is started from the change position.

9. The duplication controlling apparatus according to claim 6, further comprising a delivery device for delivering the contents having the electronic watermark embedded by the embedding device.

10. The duplication controlling apparatus according to claim 6, wherein the change position information contained in the electronic watermark is recorded as a table indicating a plurality of the change positions.

11. The duplication controlling apparatus according to claim 10, wherein the table contains contents information indicating the contents of the control information which are started from a plurality of change positions.

12. A duplication controlling apparatus for performing control in accordance with duplication-related control information embedded in contents comprising digital information, comprising
an electronic watermark reading device for reading an electronic watermark;
a change position detection device for detecting a change position of the control information; and
a control device for modifying the processing of the duplication controlling apparatus when the change position is detected by the change position detection device,
wherein the electronic watermark contains change position information indicating the change position of contents of the control information, wherein the change position information indicates an end position of the contents in which the electronic watermark is embedded, and
wherein the electronic watermark indicates control information of contents subsequent to the end position of the contents in which the electronic watermark is embedded.

13. The duplication controlling apparatus according to claim 12, wherein the change position information indicates a position where the contents of the control information indicated by the electronic watermark containing this change position information change to the subsequent contents.

14. The duplication controlling apparatus according to claim 12,
wherein the electronic watermark contains contents information indicating the contents of the control information which is started from the change position, and the control device modifies the processing in accordance with the contents information contained in the electronic watermark.

15. The duplication controlling apparatus according to claim 12, further comprising a reproduction device for reproducing the contents is provided, wherein the reproduction device is controlled by the control device.

16. The duplication controlling apparatus according to claim 12, further comprising
a recording device for recording the contents is provided, wherein the recording device is controlled by the control device.

17. The duplication controlling apparatus according to claim 12, further comprising a reception device for receiving the contents are provided, wherein the reception device are controlled by the control device.

18. The duplication controlling apparatus according to claim 12, wherein the change position information contained in the electronic watermark is recorded as a table indicating a plurality of the change positions.

19. The duplication controlling apparatus according to claim 18, wherein the table contains contents information indicating the contents of the control information which is started from a plurality of the change positions.

20. A computer-readable medium in which a program is recorded, the program causing a computer to execute an embedding processing of an electronic watermark indicating duplication-related control information into contents comprising digital information, the program causing the computer to function as:
an inserting device for inserting change position information indicating a change position of contents of the control information into the electronic watermark, wherein the change position information indicates an end position of the contents in which the electronic watermark is embedded;
an embedding device for embedding the watermark into the contents; and
a detecting device for detecting the watermark before duplication is executed,
wherein the electronic watermark indicates control information of contents subsequent to the end position of the contents in which the electronic watermark is embedded.

21. The computer-readable medium according to claim 20, wherein the change position information indicates a position of switching from the contents of the control information indicated by the electronic watermark containing the change position information, to the subsequent contents.

22. The computer-readable medium according to claim 20, wherein the electronic watermark contains contents information indicating the contents of the control information which is started from the change position.

23. The computer-readable medium according to claim 20, wherein the change position information contained in the electronic watermark is recorded as a table indicating a plurality of the change positions.

24. The computer-readable medium according to claim 23, wherein the table contains contents information indicating the contents of the control information which is started from the plurality of change positions.

* * * * *